(12) United States Patent
Paice

(10) Patent No.: US 6,525,951 B1
(45) Date of Patent: Feb. 25, 2003

(54) SIMPLIFIED WYE CONNECTED 3-PHASE TO 9-PHASE AUTO-TRANSFORMER

(76) Inventor: Derek Albert Paice, 114 Rosewood Ct., Palm Harbor, FL (US) 34685

( * ) Notice: Subject to any disclaimer, the term of this patent is extended or adjusted under 35 U.S.C. 154(b) by 0 days.

(21) Appl. No.: 10/054,785

(22) Filed: Jan. 25, 2002

(51) Int. Cl.[7] ............................................... H02M 5/00

(52) U.S. Cl. ...................................... 363/154; 363/153

(58) Field of Search ........................... 363/5, 148, 149, 363/152, 153, 154

(56) References Cited

U.S. PATENT DOCUMENTS

| | | | | |
|---|---|---|---|---|
| 5,455,759 A | * | 10/1995 | Paice | 363/126 |
| 5,619,407 A | * | 4/1997 | Hammon | 363/155 |
| 6,191,968 B1 | * | 2/2001 | Paice | 363/148 |
| 6,249,443 B1 | * | 6/2001 | Zhou et al. | 363/5 |

OTHER PUBLICATIONS

"Power Electronic Converter Harmonics" by Derek A. Paice, IEEE Press, ISBN 0–7803–1137–X, 1995.*

* cited by examiner

*Primary Examiner*—Matthew Nguyen

(57) ABSTRACT

In an 18-pulse converter system a three-phase to nine-phase auto-transformer with multiple windings per phase is used to power a nine-phase AC to DC converter. The transformer kVA rating is about 55% of the DC load kW. The basic topology is that of a wye connection, but an active delta path is added to allow circulation of the third harmonics necessary for proper operation. The design requires substantially fewer coils than other three-phase to nine-phase auto-transformers. The voltage ratio can be selected so as to give an average DC output from an 18-pulse converter which is generally the same as that of a conventional three-phase bridge rectifier without a transformer. However, the topology described is also suitable for step up or step down of voltage as required. Where necessary to further reduce high frequency harmonic currents, a three-phase ac line reactor may be connected in series with the source of ac power.

7 Claims, 8 Drawing Sheets

SIMPLIFIED WYE CONNECTED 3-PHASE TO 9-PHASE AUTO-TRANSFORMER

FIELD OF THE INVENTION

The invention relates to static AC-to-DC power converters, such as can be used for AC or DC motor drive systems.
References Cited
U.S. Patent Documents
   U.S. Pat. No. 5,455,759 October 1995 Paice
   U.S. Pat. No. 5,619,407 April 1997 Hammond
   U.S. Pat. No. 6,191,968 February 2001 Paice
Other Publications
   "Power Electronic Converter Harmonics" by Derek A. Paice, published 1995 by the IEEE Press, ISBN 0-7803-1137-X

BACKGROUND OF THE INVENTION

To meet industry needs for electrical power converters which convert AC to DC without injecting large amounts of harmonic currents into the power system, several transformer and converter topologies are available. All require installation of extra equipment and add to the total cost. Preferred methods are those which perform well in practical power systems which incorporate voltage unbalance and preexisting harmonic voltages. Powerful techniques, in which three-phase power is converted to nine-phase power before processing, have been described in U.S. Pat. Nos.5, 455,7595, 5,619,407 and 6,191,968 B1. Continual improvements are sought to reduce cost, particularly in systems with lower output current.

This invention describes a three-phase to nine-phase transformer with seven fewer windings than in U.S. Pat. No. 6,191,968 B1. A wider range of wire sizes is used in manufacture, but a savings in cost and weight is obtained, especially in lower HP ratings.

BRIEF SUMMARY OF THE INVENTION

A three-phase to nine-phase auto-transformer with the main windings configured in a wye manner is arranged to provide nine output voltages which are of generally equal amplitude with a phase displacement of generally 40°. Such voltages applied to a nine-phase bridge rectifier arrangement result in low harmonic currents being drawn from the three-phase AC power source. Thus the rectifier equipment is much better able to conform to specifications such as IEEE 519 which restrict the amount of harmonic current which may be injected into an electrical power system. In its original form for 18-pulse operation as described in U.S. Pat. No. 6,191,968 B1 a single transformer with seven coils per phase provides nine output voltages of an amplitude such that the converter DC output voltage is generally the same as would be obtained with a three-phase rectifier bridge connected directly to the three-phase power source. By this means lower harmonic currents are feasible without affecting the basic design of existing conversion equipments. However, if required, higher or lower voltages can be achieved with suitable tappings on the transformer windings in a manner well known to those familiar with transformer design. A simplification to U.S. Pat. No. 6,191,968 B1 enables similar low harmonic currents to be obtained, but with a total of only 14 coils.

The preferred embodiment for 18-pulse operation with a total of 14 coils is shown in FIG. 3. It includes a basic wye structure auto-transformer, such as that taught in U.S. Pat. No. 6,191,968 B1 but includes only one delta path instead of six. For example, in FIG. 3, one coil labeled N7C is connected between terminals 2 and P1 to provide a path for 3rd harmonics of current.

DESCRIPTION OF THE INVENTION

Figure 1:
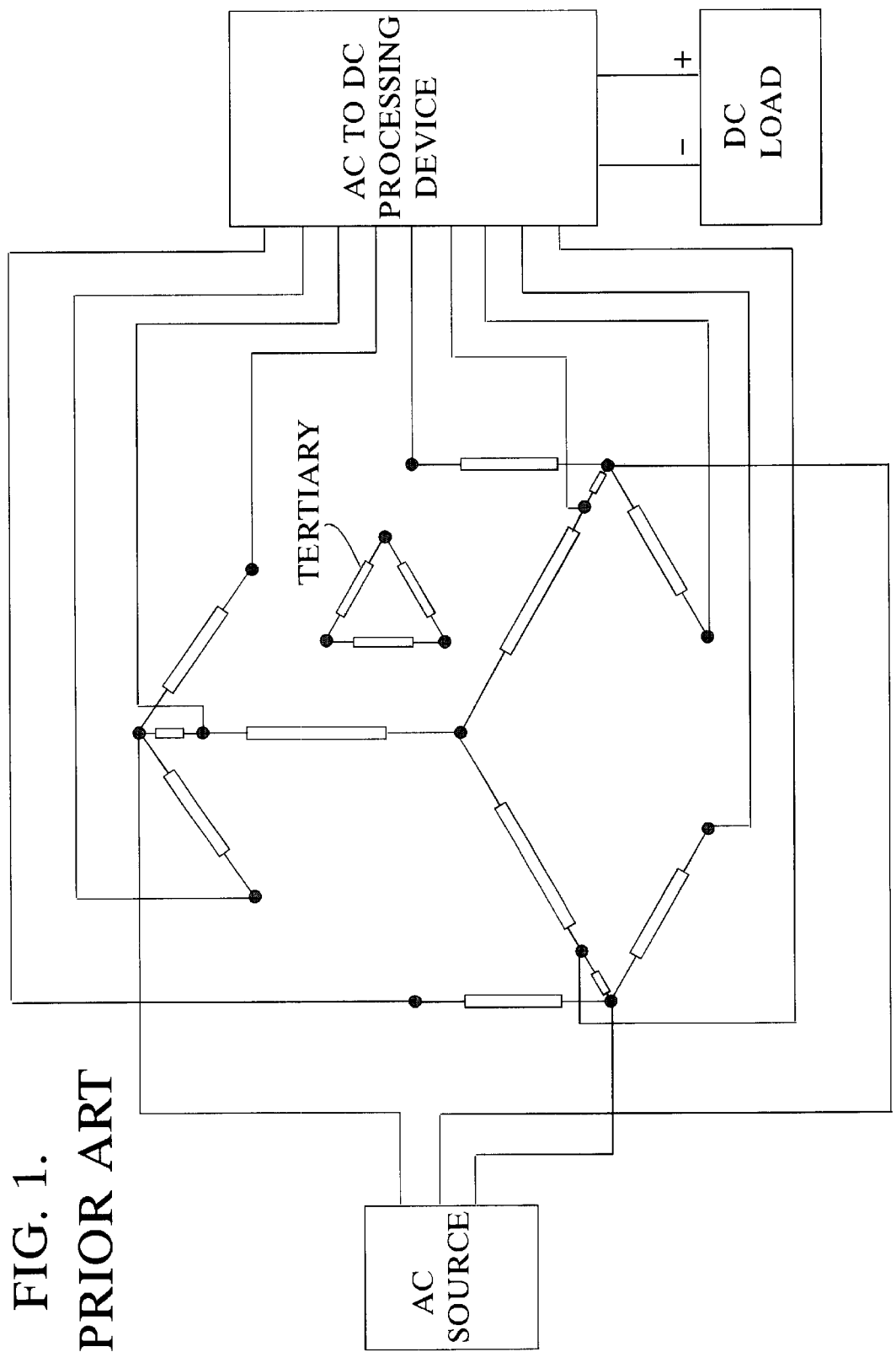
FIG. 1 shows the prior art of U.S. Pat. No. 5,455,759 in which a three-phase to nine-phase auto-transformer with basic wye connections uses stub (ZIG) windings from the wye connections to provide additional outputs of appropriate amplitude and phase. In this design a tertiary winding provides a path for 3rd harmonics of current to flow.
Figure 2:
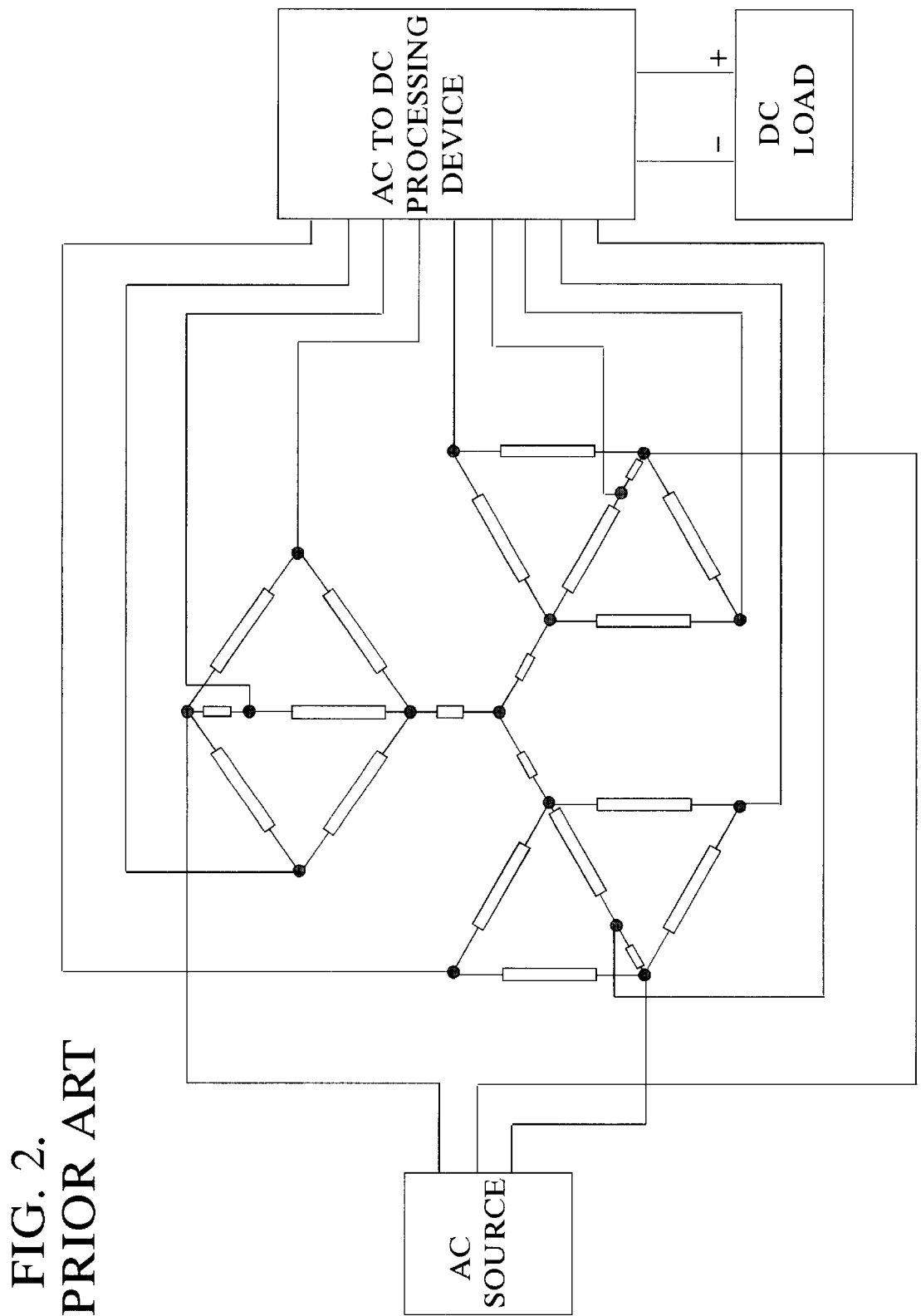
FIG. 2 shows the prior art of U.S. Pat. No. 6,191,968 B1 in which a three-phase to nine-phase auto-transformer has six delta coil connections to reduce individual coil currents and provide paths for $3^{rd}$ harmonics of current.
Figure 3:
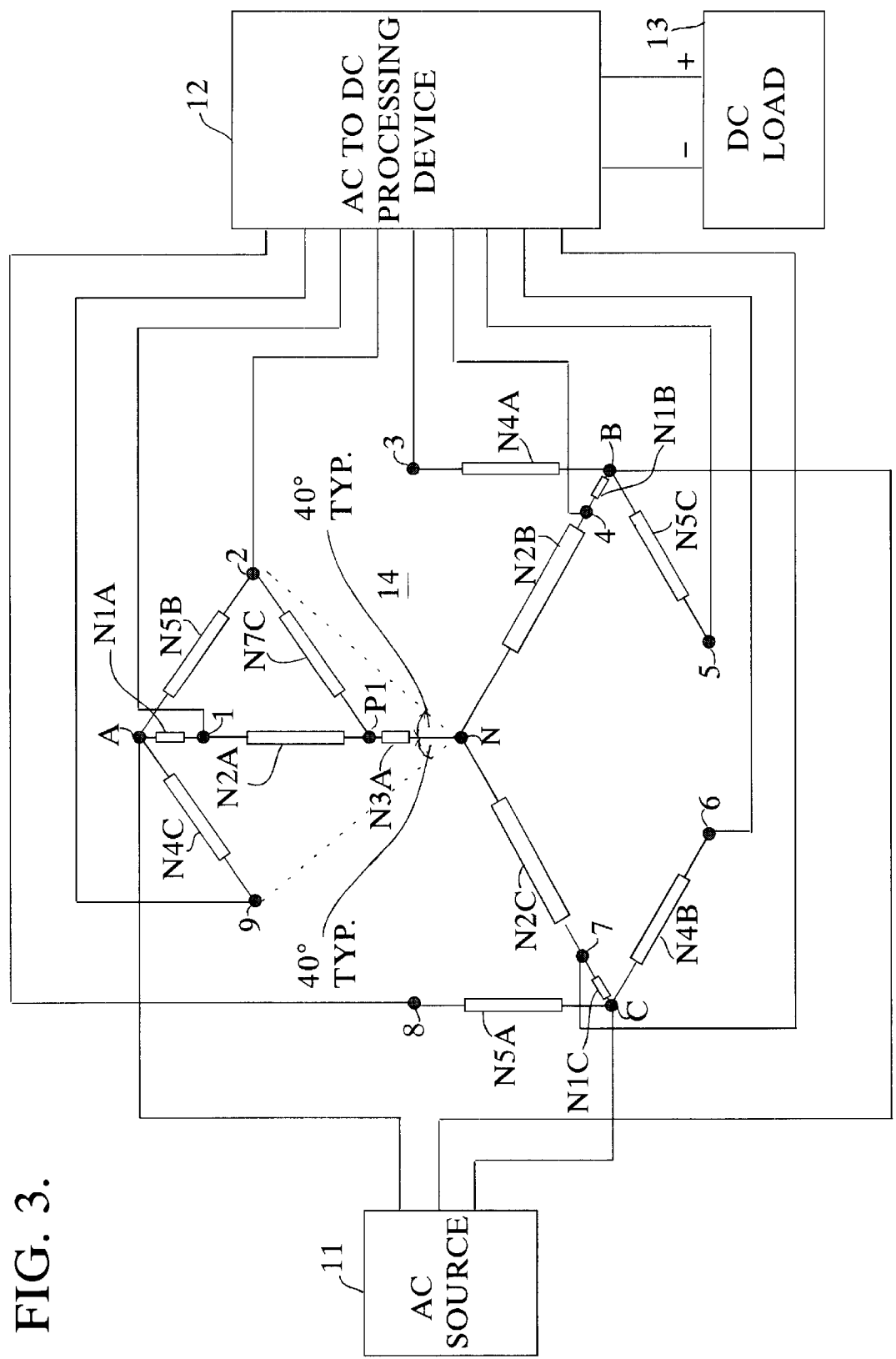
FIG. 3 shows the auto-transformer invention 14, described in this patent. The invention is similar to that of U.S. Pat. No. 6,191,968 B1 except that only one delta circuit, such as defined by coils N2A, N7C, and N5B is provided. The delta connection provides a path for 3rd harmonics of current. In its preferred embodiment a total of 14 coils are required, seven less than in U.S. Pat. No. 6,191,968 B1
Figure 4:
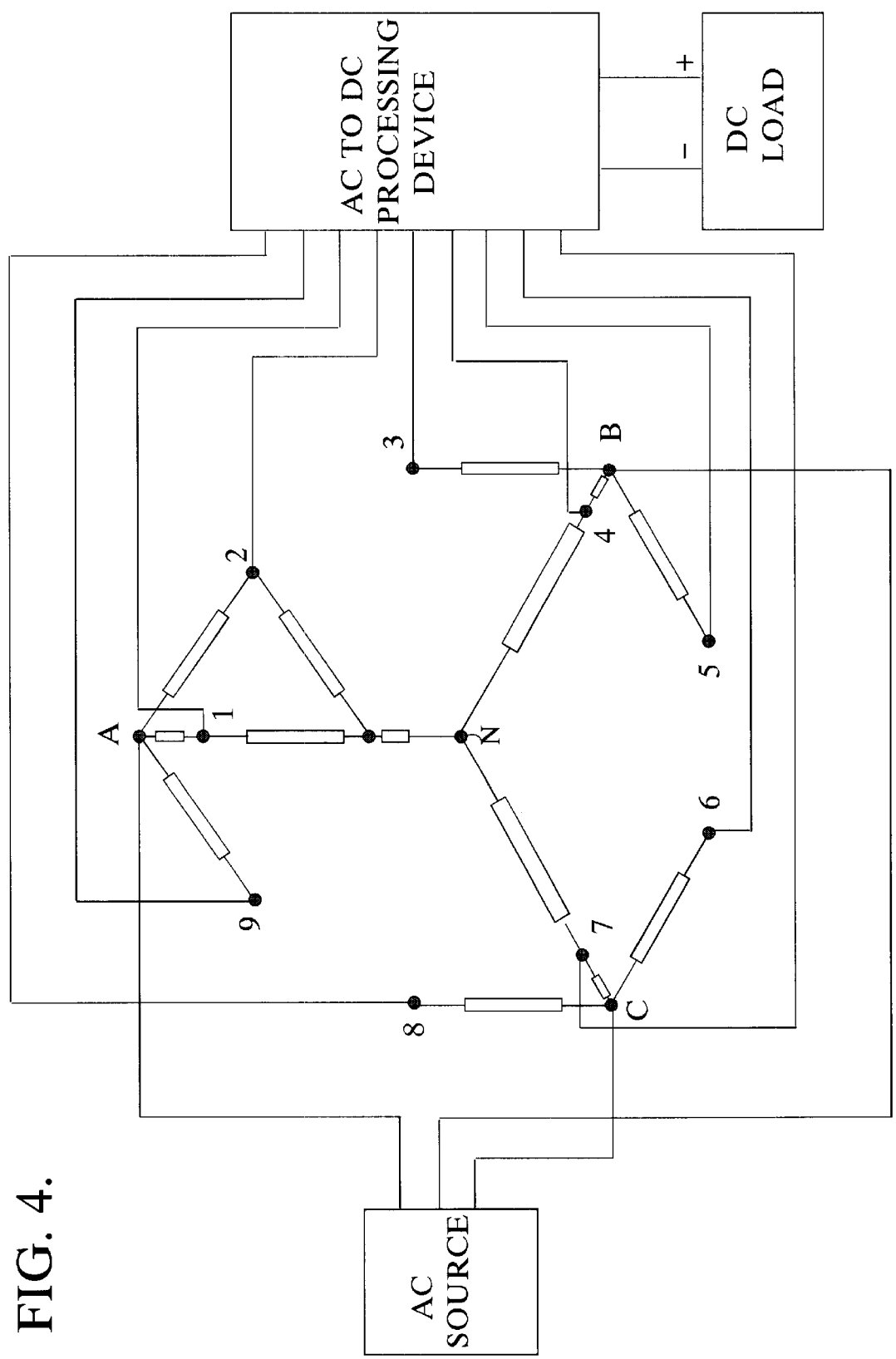
FIG. 4 shows a basic schematic connection of the auto-transformer invention with the winding reference numbers omitted for clarity.

FIG. 3 gives a schematic representation of the invention in which transformer coils are represented by rectangles. For example, coils associated with phase A are labeled N1A, N2A, etc. Likewise for phases B and C they are respectively N1B, N2B etc. and N1C, N2C etc. The alpha numeric description provides a means to indicate the number of turns on each coil, as shown in table 1. In practice, there is not a rigorous distinction between the terms "coil" and "winding" and the terms may be used synonymously in this discussion. Points of connection to the various coils are indicated by a circular dot. The junction of coils N3A, N2B, and N2C constitute a neutral point N. Voltages from the AC source 11, are supported by turns (N1A+N2A+N3A) for phase A, turns (N1B+N2B) for phase B, and turns (N1C+N2C) for phase C. The three-phase auto-transformer consists of coils wound over a magnetic structure having at least three limbs, one for each phase. The most prevalent magnetic structure is commonly referred to as a three-limb core assembly, but the design can use other magnetic structures as described in classic transformer books and literature. Also it is feasible to construct the transformer using three separate single-phase structures, should this be desired.

A three-phase power source 11, with generally equal voltage amplitudes and phase displacement of 120° is connected to terminals A, B, and C representing the three-phases A, B, and C of the invention. The nine-phase output terminals are designated as points 1 through 9 and are fed to an AC to DC output processing device 12 such as a nine-phase bridge rectifier. Output from 12 is fed to a DC load 13 such as an adjustable frequency motor drive inverter.

To avoid unwanted circulating currents at fundamental frequency, the turns N5B, and N7C, are each equal in number to the sum of turns N1A and N2A. The volts per turn in a given transformer design are fixed and thus voltage across any coil simply varies as its turns. For example, if the voltage from A to N is $V_{A-N}$ and the voltage from 1 to N is $V_{1-N}$ then:

$$V_{1-N} = V_{A-N} \frac{(N2A + N3A)}{(N1A + N2A + N3A)}$$

It is shown in ISBN 0-7803-1137-X that certain desirable turns and turns ratios exist in the basic wye connection to obtain nearly equal amplitude output voltage vectors shifted by 40°. These basic ratios affect turns N1 through N5 and are maintained in this invention. However, the addition of turns N7 and the tapping produced at point P1, allows the unique results of this invention to be obtained. Some practical examples defining the required number of turns are given in table 1. Excellent results are achieved with these practical integer numbers. Small amplitude and phase angle deviations from the ideal are noted in the table. These deviations do not detract from the practical usefulness of the design and it will be apparent to those of ordinary skill in the art that other turns selections are feasible.

If the transformer voltage vectors are assumed to be represented by the coils shown in FIG. 3 then the amplitude and phase of output voltages can be determined. For example, let the voltage $V_{A-N}$ be used as the reference vector and defined as $1\angle 0°$, then the output voltage $V_{1-N}$ is given by $V_{1-N}=1\angle 0°$ (N2A+N3A)/(N1A+N2A+N3A). The output voltage $V_{2-N}$ is given by $V_{2-N}=1\angle 0°+1\angle -120°$ (N5B/(N1B+N2B)). Other voltages are calculated using the vector algebra in a similar fashion. Because the turns are all integer values it is readily possible to select turns N5B and N7C to each equal the sum of turns (N1A+N2A). As an example of the phase shift to be obtained, consider the turns in the first row of table 1, then:

$V_{1-N}=0.8792\angle 0°$, and $V_{2-N}=1\angle 0°+0.651\angle -120\sim$,
i.e. $0.8791\angle -39.890°$.

TABLE 1

Possible Turns for Auto-transformer and Resulting Characteristics

| N1 turns | N2 turns | N3 turns | N4 turns | N5 turns | N6 turns | N7 turns | Amplitude deviation from ideal. | Phase angle deviation from 40°. |
|---|---|---|---|---|---|---|---|---|
| 18 | 79 | 52 | 97 | 97 | 97 | 97 | −0.012% | −0.109° |
| 11 | 49 | 31 | 60 | 60 | 60 | 60 | 0.16% | 0.425° |
| 6 | 27 | 17 | 33 | 33 | 33 | 33 | 0.07% | 0.46° |
| 6 | 26 | 18 | 32 | 32 | 32 | 32 | −0.31% | −0.817° |
| 5 | 23 | 15 | 28 | 28 | 28 | 28 | −0.5% | −0.01° |
| 4 | 18 | 11 | 22 | 22 | 22 | 22 | 0.35% | 0.893° |
| 3 | 13 | 9 | 16 | 16 | 16 | 16 | −0.3% | −0.8° |
| 2 | 9 | 6 | 11 | 11 | 11 | 11 | −0.446% | −0.363° |

Voltages across the various coils and the currents flowing through them will vary slightly depending upon the exact choice of turns, however, practical calculations to obtain the typical transformer rating can be made. Using formulas derived in ISBN 0-7803-1137-X, the winding voltages can be defined. If the amplitude of the nine output AC voltages is $V_{OUT}$ and the DC output voltage from a nine-phase rectifier load as the processing device is $V_{DO}$ then:

$V_{DO}=2.77\ V_{OUT}$ or written alternatively, $V_{OUT}=0.361\ V_{DO}$

Using this result, voltages across the various coils can be determined in terms of the DC output voltage. Calculation of the winding currents in terms of the total DC load current $I_{DC}$ is not straightforward due to the complex time-varying current functions and the precise nature of the load current. However, an approximate worst-case result is obtained by assuming a large DC circuit filter capacitor such as used in many VFD (Variable Frequency Drive) converters. In conjunction with a practical computer simulation the following approximate results shown in table 2 are obtained:

TABLE 2

Typical Coil RMS Current Relative to $I_{DC}$ in Transformer With a Single Delta Path as in FIG. 3.

| Phase A | | Phase B | | Phase C | |
|---|---|---|---|---|---|
| Turns | $I_{RMS}/I_{DC}$ | Turns | $I_{RMS}/I_{DC}$ | Turns | $I_{RMS}/I_{DC}$ |
| N1A | 0.475 | N1B | 0.55 | N1C | 0.55 |
| N2A | 0.36 | N2B | 0.2 | N2C | 0.2 |
| N3A | 0.2 | N4B | 0.438 | N4C | 0.438 |
| N4A | 0.438 | N5B | 0.468 | N5C | 0.438 |
| N5A | 0.438 | | | N7C | 0.312 |

To calculate the equivalent transformer kVA power rating relative to the output DC power, the total volt-ampere product for each of the coils is summed. The final result is:

$$\frac{\text{Transformer kVA}}{\text{DC load kW}} \approx 0.56$$

The above kVA rating constitutes a very favorable ratio and results in a transformer rating which is less than half that required in a practical double-wound transformer to achieve the same 18-pulse converter results.

Figure 5:
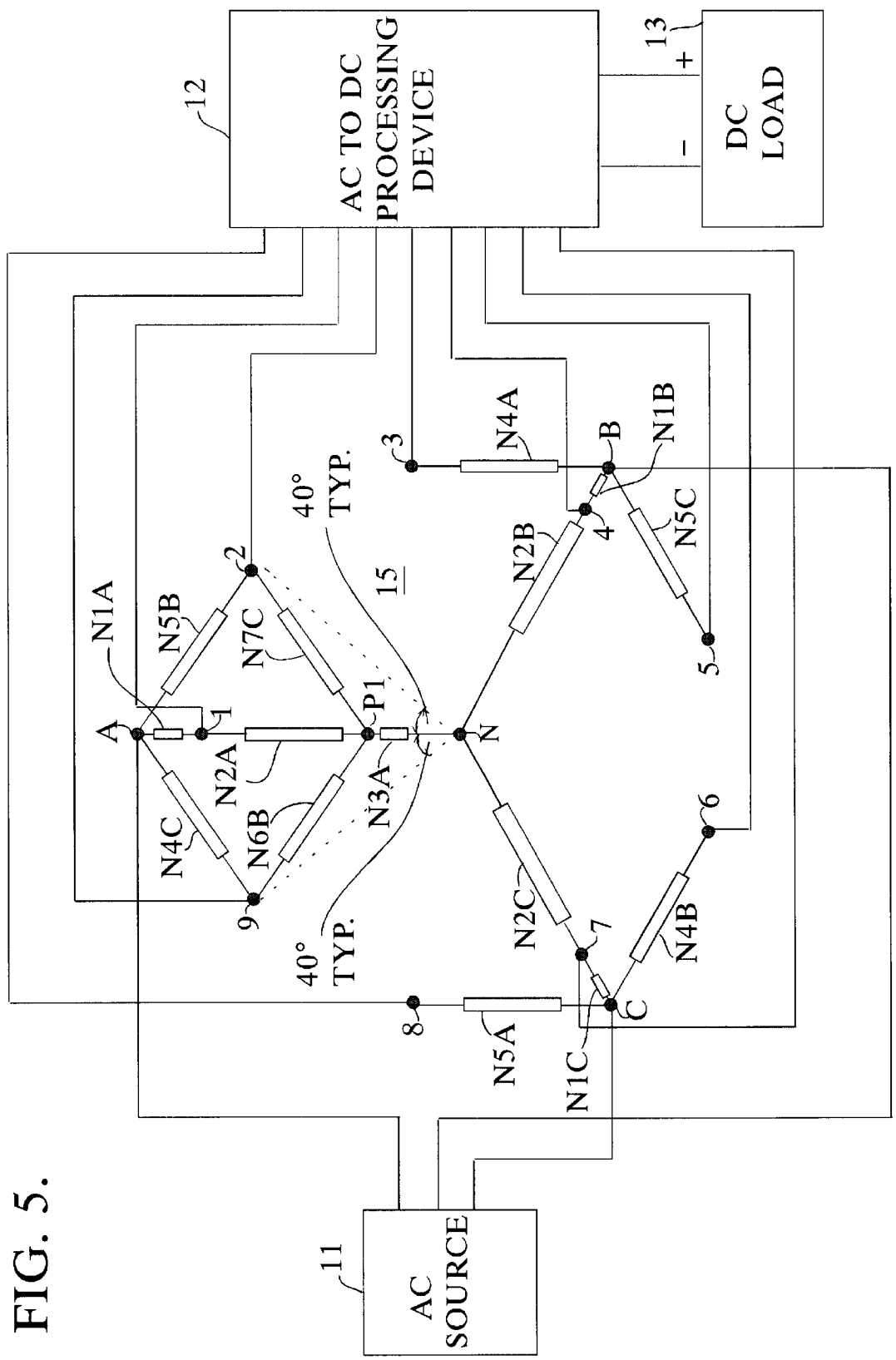
FIG. 5 shows another embodiment of the auto-transformer invention 15, described in this patent, in which two delta circuits are defined by coil groups such as N2A, N7C, and N5B, also coils N2A, N6B, and N4C. In this second embodiment a total of 15 coils is required.
Figure 6:
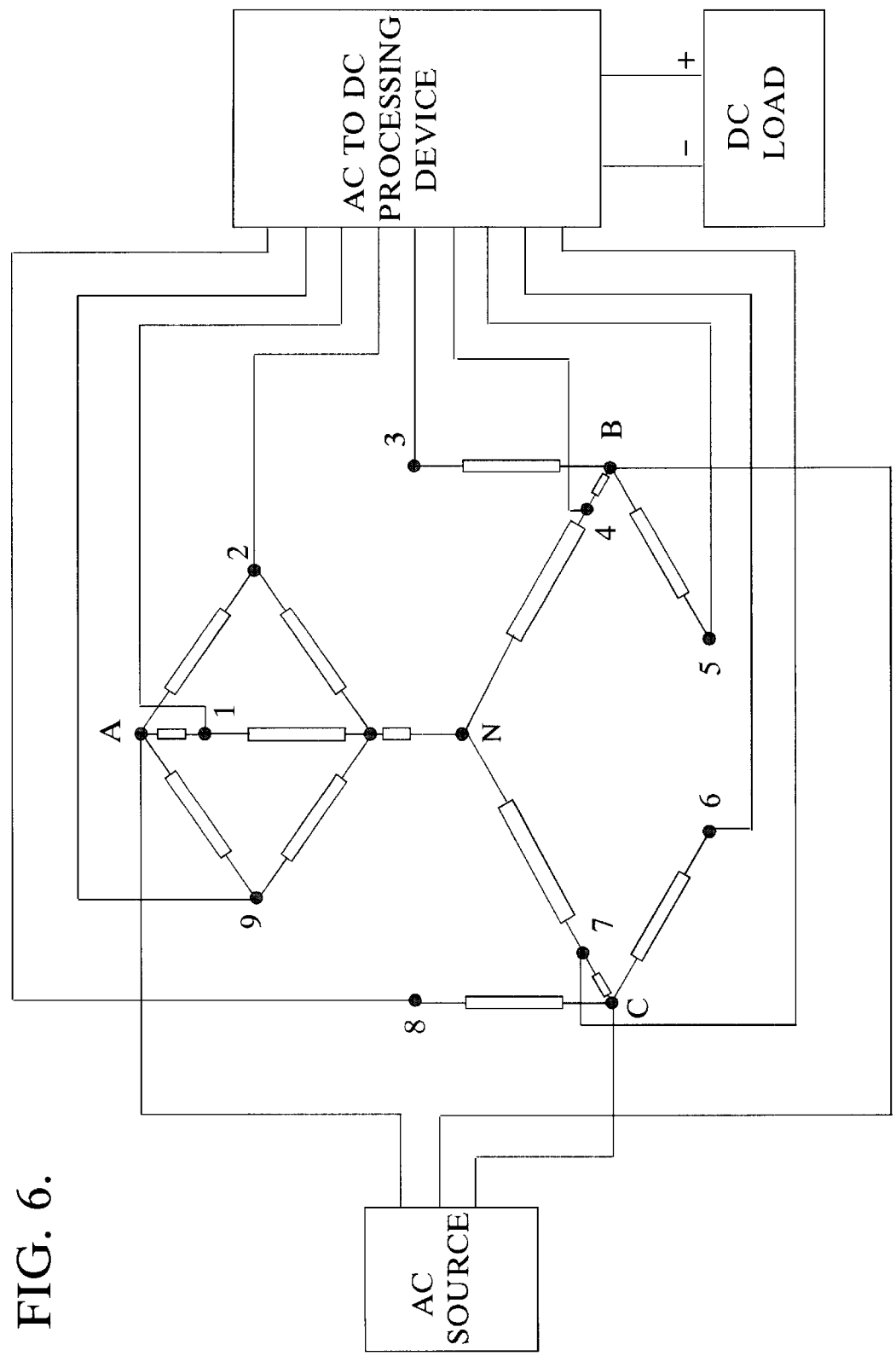
FIG. 6 shows a basic schematic connection of the embodiment shown in FIG. 5 with the winding reference numbers omitted for clarity.

In a second embodiment of the invention, as shown in FIG. 5, a second delta path is formed by the addition of coil N6B. Using a practical computer simulation, approximate values for coil current in this configuration are given in table 3.

TABLE 3

Typical Coil RMS Current Relative to $I_{DC}$ in Transformer With Two Delta Paths as in FIG. 5.

| Phase A | | Phase B | | Phase C | |
|---|---|---|---|---|---|
| Turns | $I_{RMS}/I_{DC}$ | Turns | $I_{RMS}/I_{DC}$ | Turns | $I_{RMS}/I_{DC}$ |
| N1A | 0.475 | N1B | 0.55 | N1C | 0.55 |
| N2A | 0.36 | N2B | 0.2 | N2C | 0.2 |
| N3A | 0.2 | N4B | 0.438 | N4C | 0.335 |
| N4A | 0.438 | N5B | 0.335 | N5C | 0.438 |
| N5A | 0.438 | N6B | 0.238 | N7C | 0.238 |

To calculate the equivalent transformer kVA power rating relative to the output DC power, the total volt-ampere product for each of the coils is summed. The final result is practically the same as for a single delta coil, namely:

$$\frac{\text{Transformer kVA}}{\text{DC load kW}} \approx 0.55$$

Figure 7:
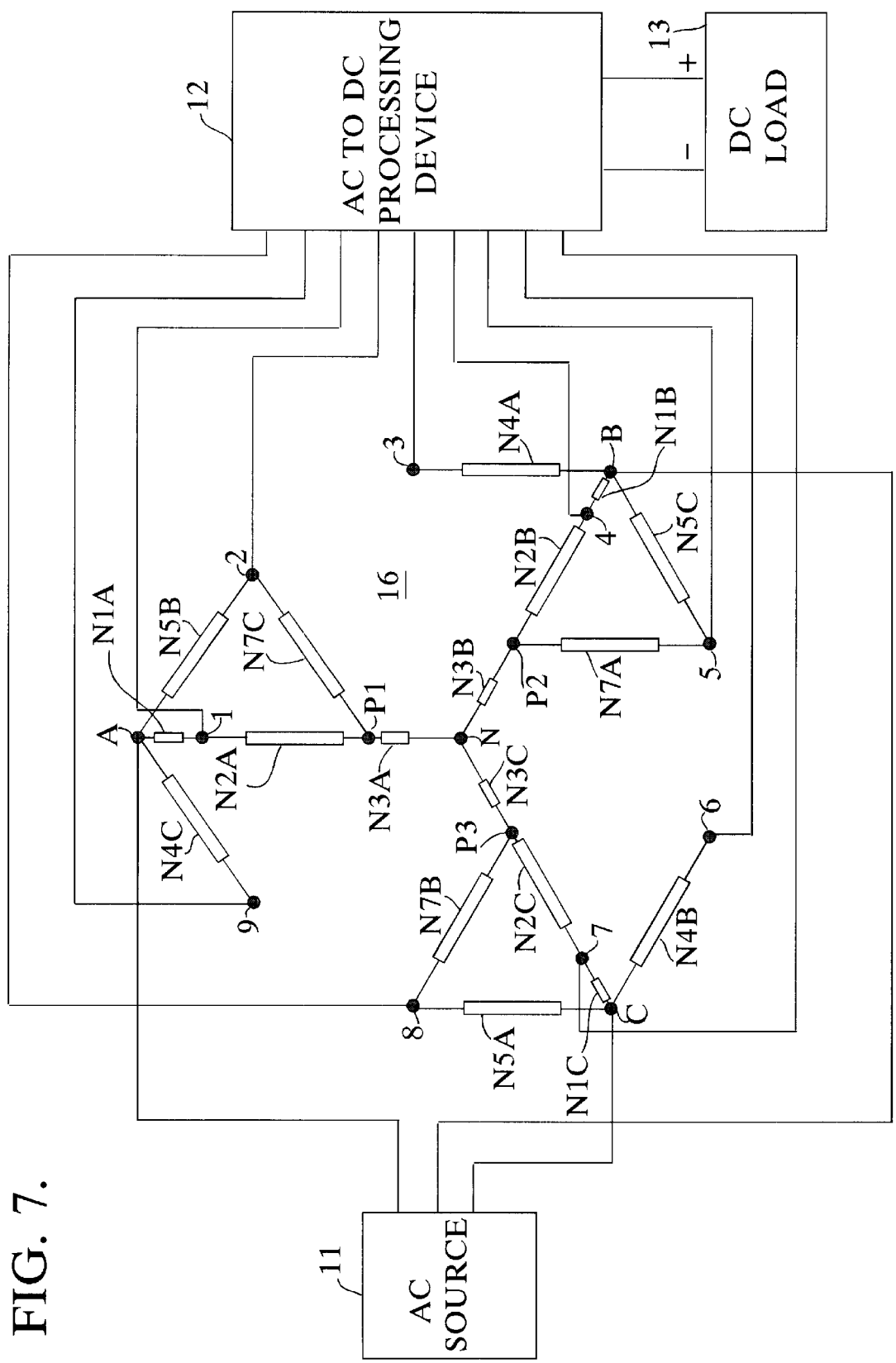
FIG. 7 shows another embodiment of the auto-transformer invention 16 in which three delta paths are obtained with coils N2A, N7C, N5B, and coils N2B, N7A, N5C, and coils N2C, N7B, N5A, respectively.

FIG. 7 shows a third embodiment of the auto-transformer invention in which phases A, B, and C have similar series coils comprising N1A, N2A, N3A, and N1B, N2B, N3B and N1C, N2C, N3C respectively. Three stub windings, N7C, N7A, and N7B connect to points P1, P2, and P3 respectively to form three delta paths. Results from a practical computer simulation of this connection are given in table 4. In this example the relationship between transformer kVA and DC load is also typically 0.55.

Figure 8:
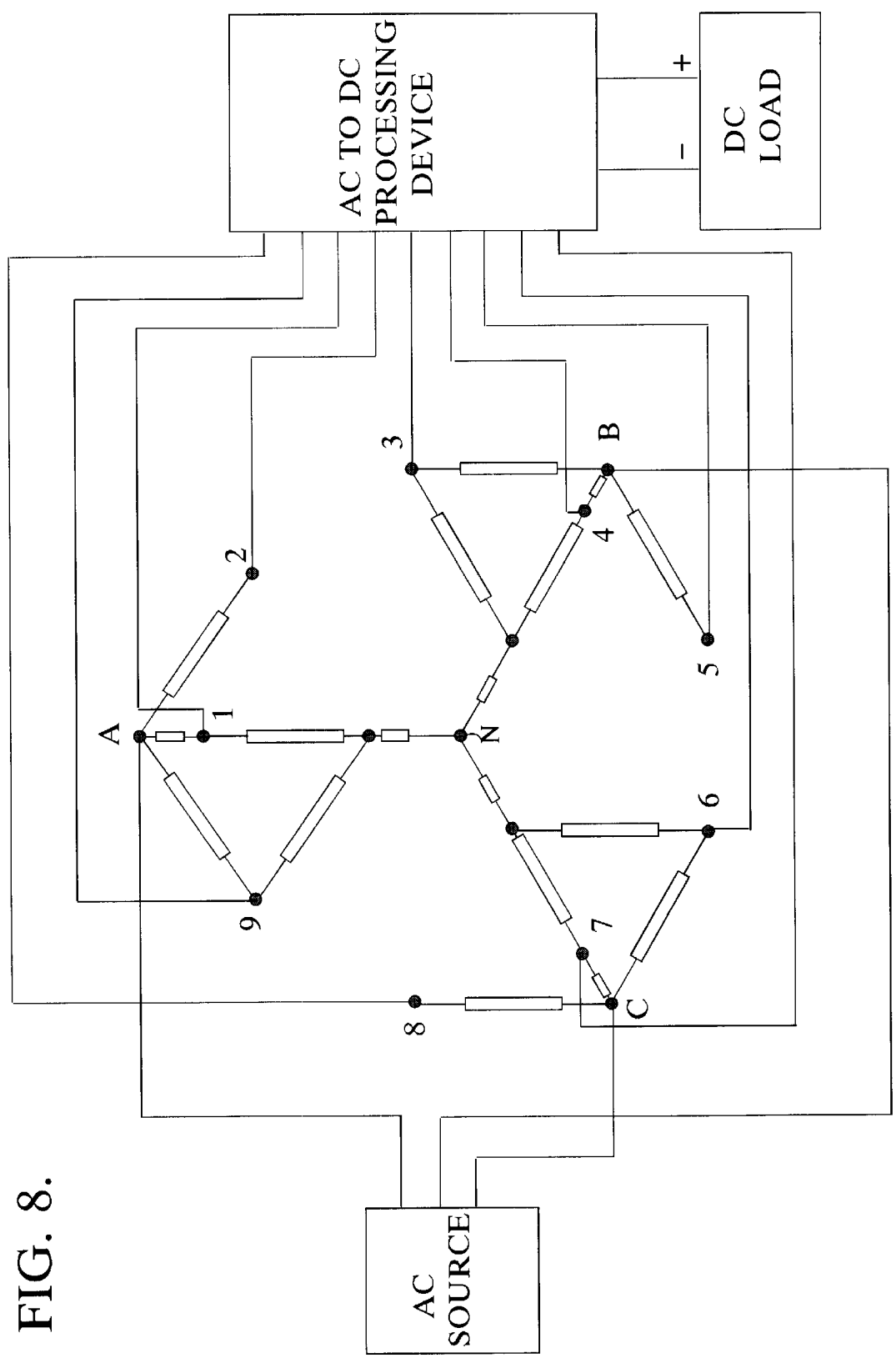
FIG. 8 gives a simple variation of the scheme shown in FIG. 7.

It will be readily apparent to those of ordinary skill pertinent to the art that variations in the number and placement of stub coil connections can result in from 1 to six delta paths. FIG. 8, illustrates one of those other variations.

TABLE 4

Typical Coil RMS Current Relative to $I_{DC}$ in Transformer With Three Delta Paths as in FIG. 7.

| Phase A | | Phase B | | Phase C | |
| --- | --- | --- | --- | --- | --- |
| Turns | $I_{RMS}/I_{DC}$ | Turns | $I_{RMS}/I_{DC}$ | Turns | $I_{RMS}/I_{DC}$ |
| N1A | 0.486 | N1B | 0.486 | N1C | 0.486 |
| N2A | 0.2 | N2B | 0.2 | N2C | 0.2 |
| N3A | 0.2 | N4B | 0.2 | N4C | 0.2 |
| N4A | 0.435 | N5B | 0.435 | N5C | 0.435 |
| N5A | 0.324 | N6B | 0.324 | N7C | 0.324 |
| N7A | 0.2 | N7B | 0.2 | N7C | 0.2 |

What I claim is:

1. An auto-transformer for converting three-phase AC power to nine-phase AC power, comprising:
   a. three phases each having a plurality of serial and stub windings;
   b. said serial windings forming a wye connection;
   c. said stub windings each being magnetically coupled with corresponding ones of said serial windings;
   d. said serial windings being connected at one end to the corresponding point of said serial windings of the other two phases to form an electrical neutral point;
   e. three terminals connected to respective ends of said serial windings furthermost from the neutral point for connecting to a source of three-phase AC power;
   f. the end of said serial windings furthermost from the neutral point being connected to one end of a first set of two stub windings comprising windings from the other two phases;
   g. the opposite end of said stub windings from the other two phases providing a total of six output terminals;
   h. three additional output terminals being provided at the opposite end of serial windings on each phase closest to the source of three-phase AC power;
   i. a first phase wherein a stub winding from another phase is connected to the junction of said serial windings closest to the neutral point;
   j. the opposite end of said stub winding being connected to the end of the stub winding of the remaining phase remote from the source of the AC power to the first phase to form a first delta circuit.

2. An auto-transformer as in claim 1 wherein a second stub winding is connected to the junction of serial windings closest to the neutral point on the first phase; the other end of said stub winding being connected to the end of a stub winding remote from the source of AC power to the first phase to form a second delta circuit.

3. The auto-transformer of claim 1 with generally similar series connected windings on the second and third phases; with delta connected circuits similarly arranged on the second and phases to make a total of three delta circuits.

4. The auto-transformer of claim 1 with generally similar series connected windings on the second and third phases; with one through five delta circuits obtained by connection of appropriately placed stub coils.

5. The auto-transformer of claim 1 wherein the nine output voltages are generally equal in amplitude and separated from each other by generally 40° taken in sequence.

6. The auto-transformer of claim 1 with an additional tapping on said serial windings such that the source of AC power may be connected to said tapping so as to cause an increase in the amplitude of the nine output voltages.

7. The auto-transformer of claim 1 with an additional series connected winding on each phase with said additional winding being magnetically coupled with serial windings on that phase such that the source of AC power for each phase may be connected to the end of said additional winding so as to reduce the amplitude of the nine output voltages.

* * * * *